United States Patent [19]
Chestnut

[11] Patent Number: 5,078,076
[45] Date of Patent: Jan. 7, 1992

[54] DROP MARKER SYSTEM

[75] Inventor: Edwin E. Chestnut, Milton-Freewater, Oreg.

[73] Assignee: Loveland Industries, Inc., Greeley, Colo.

[21] Appl. No.: 621,072

[22] Filed: Nov. 30, 1990

[51] Int. Cl.⁵ .......................... B64D 1/02; B65H 1/12
[52] U.S. Cl. .................................. 116/209; 221/227; 221/232; 244/137.4
[58] Field of Search ................ 116/209; 221/227, 232, 221/279; 244/136, 137.4

[56] References Cited

U.S. PATENT DOCUMENTS

| | | | |
|---|---|---|---|
| 1,878,354 | 9/1932 | Wessman | 221/279 |
| 3,407,846 | 10/1969 | Tillay et al. | 116/209 |
| 3,428,019 | 2/1969 | Tillay et al. | 116/209 |
| 3,915,338 | 10/1975 | Kronseder et al. | 221/1 |
| 4,106,668 | 8/1978 | Gebhardt et al. | 221/131 |
| 4,316,554 | 2/1982 | Lloyd | 221/232 |

Primary Examiner—William A. Cuchlinski, Jr.
Assistant Examiner—W. Morris Worth
Attorney, Agent, or Firm—Wells, St. John & Roberts

[57] ABSTRACT

A drop marker system 10 is disclosed including a drop marker dispenser 20 and a reloading magazine 70. Drop marker dispenser 20 is provided with a yieldable stop means 40 at a dispensing and reloading opening 23. The yieldable stops are provided to allow loading of a stack of drop markers along the longitudinal axis of the dispenser chute 21 while preventing discharge of the marker stack along the chute axis. The dispenser 20 and reloading magazine 70 together provide a connecting means 92 that facilitates engagement of the dispenser 20 and magazine 70 in a longitudinal aligned orientation. Spring-biased push plates are provided within both dispenser 20 and magazine 70 to urge received drop markers towards respective dispensing and discharged ends 28, 73. A movable stop bar 75 is provided on the reloading chute 71 to prevent unintentional discharge a replenishing supply of drop markers through the discharge end 73 of the reloading magazine 70. Stop 75 is selectively pivoted upwardly clear of the magazine to facilitate movement of a replenishing supply of drop markers into the dispenser chute 21 after the reloading magazine 70 has been connected to the dispenser 20.

20 Claims, 8 Drawing Sheets

DROP MARKER SYSTEM

TECHNICAL FIELD

The present invention relates to dispensing and reloading stacks of streamer-type drop markers.

BACKGROUND OF THE INVENTION

U.S. Pat. No. 3,428,019 discloses a streamer-type drop marker that has been successfully used for a number of years. Such markers are often dropped from low flying aircraft to visually mark the ground surface passed over by the aircraft. Such markers are used extensively by "crop duster" type planes to mark the field location of a spray pattern in order to avoid gaps or overlap of spray swaths.

Streamer type drop markers are typically provided in banded bundles and may be placed for dispensing within an apparatus such as that shown in U.S. Pat. No. 3,470,846. This patent discloses a remotely controlled dispenser for drop markers of the type shown in the 3,428,019 patent. The dispenser includes an elongated chute for receiving a stack of the drop markers. The stack is biased toward a dispensing end by air pressure exerted through a hole at the leading end of the chute. The rearward drop marker of the stack is held by rigid card stops that project into the rearward path of the rearwardly biased stack. A solenoid plunger is situated adjacent to the card stops and is selectively operated by a solenoid energizer to selectively eject the successive drop markers from the dispenser chute. The markers are ejected along a path that is transverse to the longitudinal orientation of the stack.

A problem that has been realized with the form of drop marker shown in U.S. Pat. No. 3,428,019 and the aircraft mounted dispenser shown in U.S. Pat. No. 3,470,846, is in loading the drop markers into the dispenser chute. Reloading is a slow, multi-step process which is unforgiving of operator error and which takes place in less than optimum conditions and often under strong pressure to get the job done quickly. The reloading must often be done with the aircraft engine running. The propeller blast greatly increases the complexity of the task of manipulating large numbers of the drop markers. The reloading sequence with an airplane mounted dispenser as necessitated by the above apparatus and marker designs is as follows:

1. The aircraft pulls into position and the engine speed is set at idle.
2. An assistant carries a supply of drop markers to the dispenser, which is typically mounted on the aircraft wing. (The marker supply usually consists of an open box of markers.)
3. The dispenser lid is opened, with care being taken that the propeller blast does not blow away any possible remaining markers within the dispenser chute.
4. Bundles of markers are then removed from the case and are inserted into the dispenser chute. A paper band holding each bundle must be removed either before or after insertion of the markers into the dispenser. The tissue paper streamers, which are an integral part of the markers, must be kept under positive control at all times during the reloading process or the streamers will unfurl in the prop blast and be rendered unusable.
5. The paper bands which have been removed must be controlled and temporarily stored for later disposal, or they will be blown away.
6. If the case of markers or a bundle of markers happens to be accidentally dropped, many of the markers may be broken, blown about, and rendered unusable. These destroyed markers must then be collected for disposal.
7. When a sufficient quantity of bundles have been inserted into the dispenser, the lid is closed and fasteners for securing the lid are latched. The dispenser is now loaded and ready for use.

The total time spent reloading while the aircraft is parked and waiting may average as much as three to four minutes. This represents a considerable expenditure of time and fuel. It is not convenient or efficient to stop the engine during the reloading period as this would still further increase the "down time" and result in little, if any, savings of fuel due to the increased amounts of energy required to restart the engine.

It therefore becomes desirable to minimize the amount of time and effort required to reload drop marker dispensers.

BRIEF DESCRIPTION OF THE DRAWINGS

Preferred embodiments of the invention are illustrated in the accompanying drawings, in which:

FIGS. 9–11 are views of a dispensing chute and an alternative form of the yieldable stop arrangement shown in FIGS. 7 and 8;

FIGS. 12–16 illustrate another form of yieldable stop arrangement and dispensing chute;

FIGS. 17–19 illustrate yet another form of the yieldable stop arrangement for the dispensing chute;

DETAILED DESCRIPTION OF THE PREFERRED EMBODIMENTS

This disclosure of the invention is submitted in furtherance of the constitutional purposes of the Patent Laws "to promote the progress of science and useful arts" (Article 1, Section 8).

The description herein relates to a drop marker system which is generally shown in the drawings (FIG. 3) by the reference character 10. The drop marker system is intended for use with streamer type drop markers generally shown at 11. In general, the markers each include a rigid card 12 (FIG. 2) and an accordion folded flag or streamer 13. The markers are usually provided in stacks or bundles.

Specific details concerning the individual drop markers and the bundles in which the drop markers 11 are typically supplied are shown in U.S. Pat. No. 3,428,019 granted Feb. 18, 1969 to D. Tillay et al. Portions of that patent relating to the drop marker construction and bundling arrangement are hereby incorporated by reference in the present application.

Figure 1:
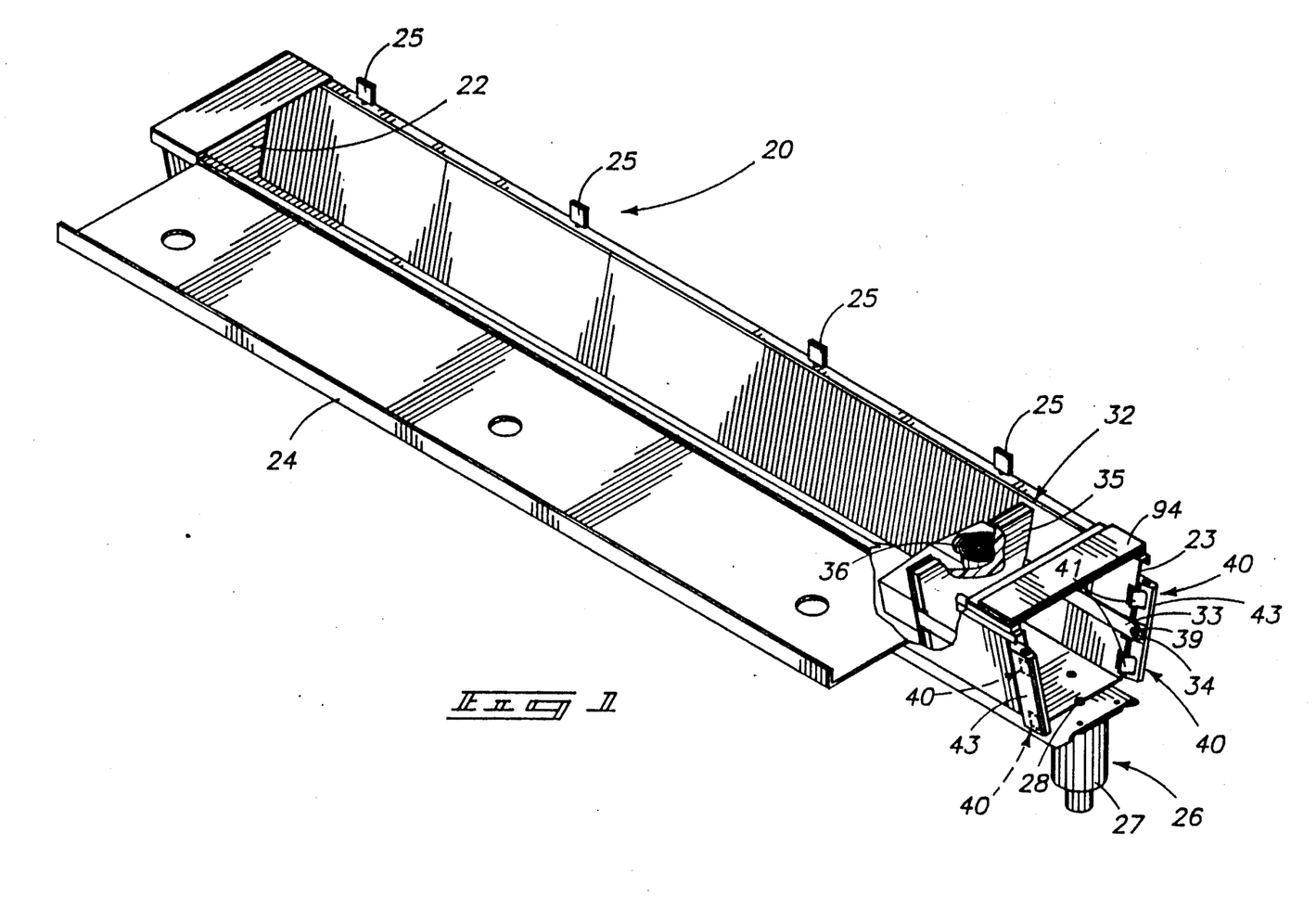
FIG. 1 is a pictorial view of a drop marker dispenser incorporating features of the present invention.

In the preferred system 10, a drop marker dispenser 20 (FIGS. 1, 3, 4) is provided. The preferred drop marker dispenser 20 includes an elongated dispenser chute 21. The cross sectional configuration of the chute 21 is similar to the partial parametrial configuration of the drop marker, which as disclosed in the drawings and in the above referenced patent, is preferably trapezoidal.

The drop marker dispenser 20 extends along a longitudinal axis between a closed end 22 and an open dispensing end 23. In a preferred form, the dispensing end 23 is also coincidental with a reloading opening. The dispensing end and reloading opening therefore function both to (a) facilitate discharge of a first stack of drop markers 11 contained within the chute 21, and (b) facilitate reloading of a second stack of drop markers from a reloading magazine 70 to be described in detail below.

A discharge means 26 is provided at the dispensing end 23. Discharge means 26 is provided to selectively eject successive drop markers 11 from the stack contained within the dispenser 20 in a direction that is transverse to the longitudinal dispenser axis. The dispensing means includes a solenoid 27 and plunger 28. Plunger 28 is positioned along the bottom surface of the dispenser chute 21 and is movable along an axis transverse to the longitudinal axis of the chute. The solenoid 27 activates the plunger to extend, engaging a drop marker card 12 presently at the dispensing end 23, and ejecting it upwardly and away from the dispenser. Details relating to the solenoid, plunger, and operation thereof may be understood with reference to U.S. Pat. No. 3,470,486 granted Oct. 7, 1969 to D. Tillay et al. Details in this patent relating to the solenoid, plunger, and operating mechanisms and marker dispensing features and procedures are therefore incorporated by reference in the present application.

A lid 24 releasably covers the otherwise open chute top to facilitate access to the interior. Closing latches 25 releasably secure the lid in a closed condition. The lid 24 is useful when the dispenser 20 is to be mounted to a vehicle such as an aircraft which moves at high speeds. The lid will protect the enclosed drop markers from wind and the elements.

A first biasing means 32 (FIG. 1) is advantageously provided within the dispenser chute 21. First biasing means 32 may be comprised of a pair of extendible flat strap coil wound springs 33 having free ends 34 attached to the chute 21 adjacent its dispensing end 23. The extendible straps extend to a push plate 35 which includes provision for housing the spring coils 36. The push plate 35 may be retracted along the length of the dispensing chute 21 responsive to an infeed of drop markers along the longitudinal axis of the chute 21. The springs will react, and continuously urge the push plate 35 to bias the received stack of drop markers toward the dispensing end 23.

Figure 4:
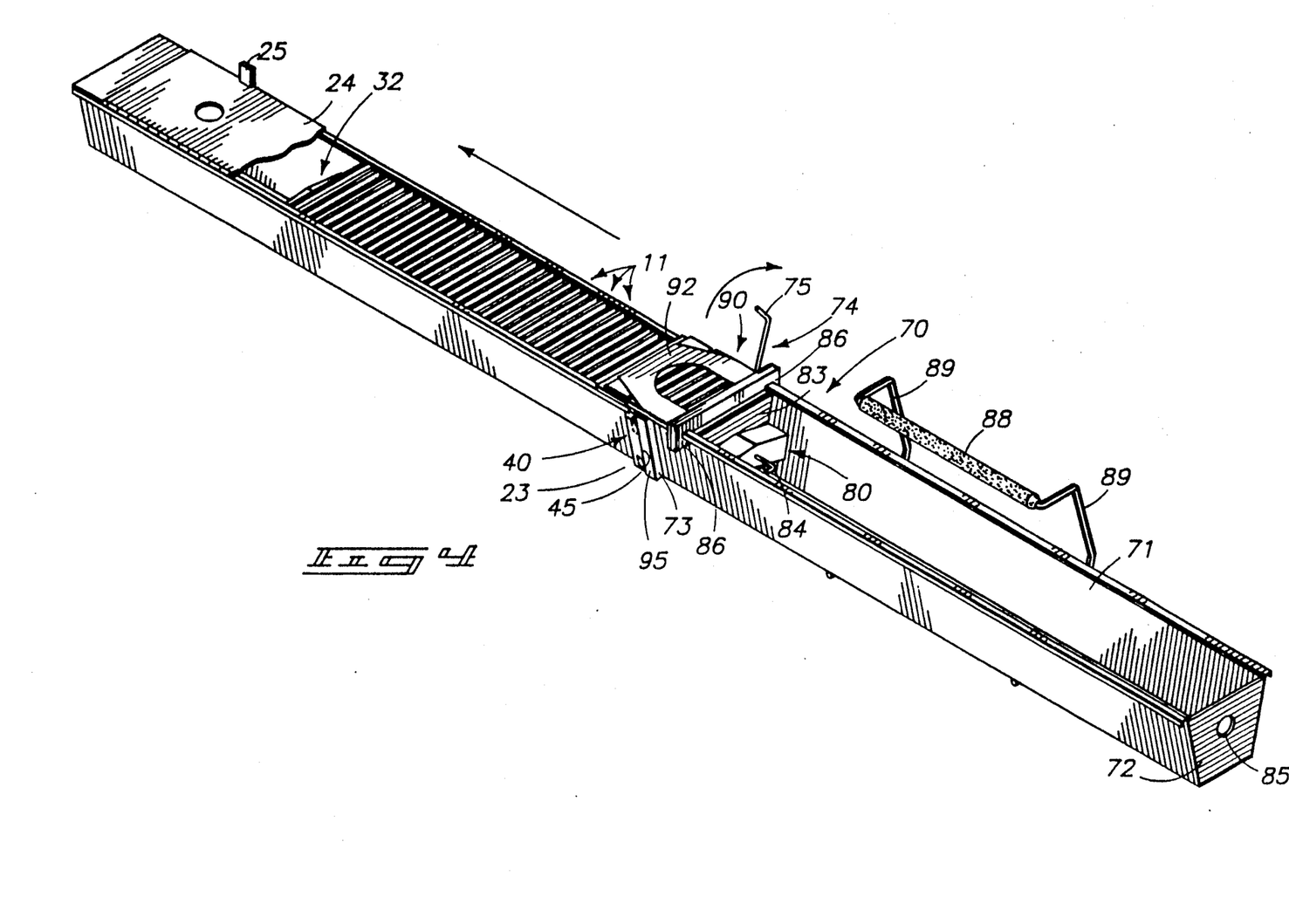
FIG. 4 is a pictorial view similar to FIG. 3 only showing the drop markers being fed into the dispensing chute from the reloading chute.

Yieldable stop means is generally shown at 40 at the dispensing end 23 for abutment with successive drop markers at the dispensing end to hold the markers from being discharged along the longitudinal dispensing chute axis. The yieldable stop means 40 is further provided to yield and thereby allow loading of drop markers through the dispensing end 23 substantially as shown by FIG. 4, along the longitudinal dispenser axis.

In the preferred form, the yieldable stop means 40 includes a number of spring-biased fingers 41. The fingers 41 are shown in general in FIG. 1 and in exploded detail by FIGS. 7 and 8. Fingers 41 are biased by torsion springs 42 toward a closed condition.

The fingers project into the confines of the dispenser chute 21 to abut field markers presently being urged along the chute axis toward the dispensing end 23. Each finger 41 includes an inclined cam surface 44 facing outwardly. The cam surfaces 44 are provided to move the fingers inwardly responsive to engagement by a drop marker card 12 along the longitudinal axis of the chute 21 from a stack being pressed into the dispensing chute 21 from the reloading magazine 70. Following the reloading procedure, the springs 42 act to snap the fingers 41 back into their operative position.

Figures 7, 8:
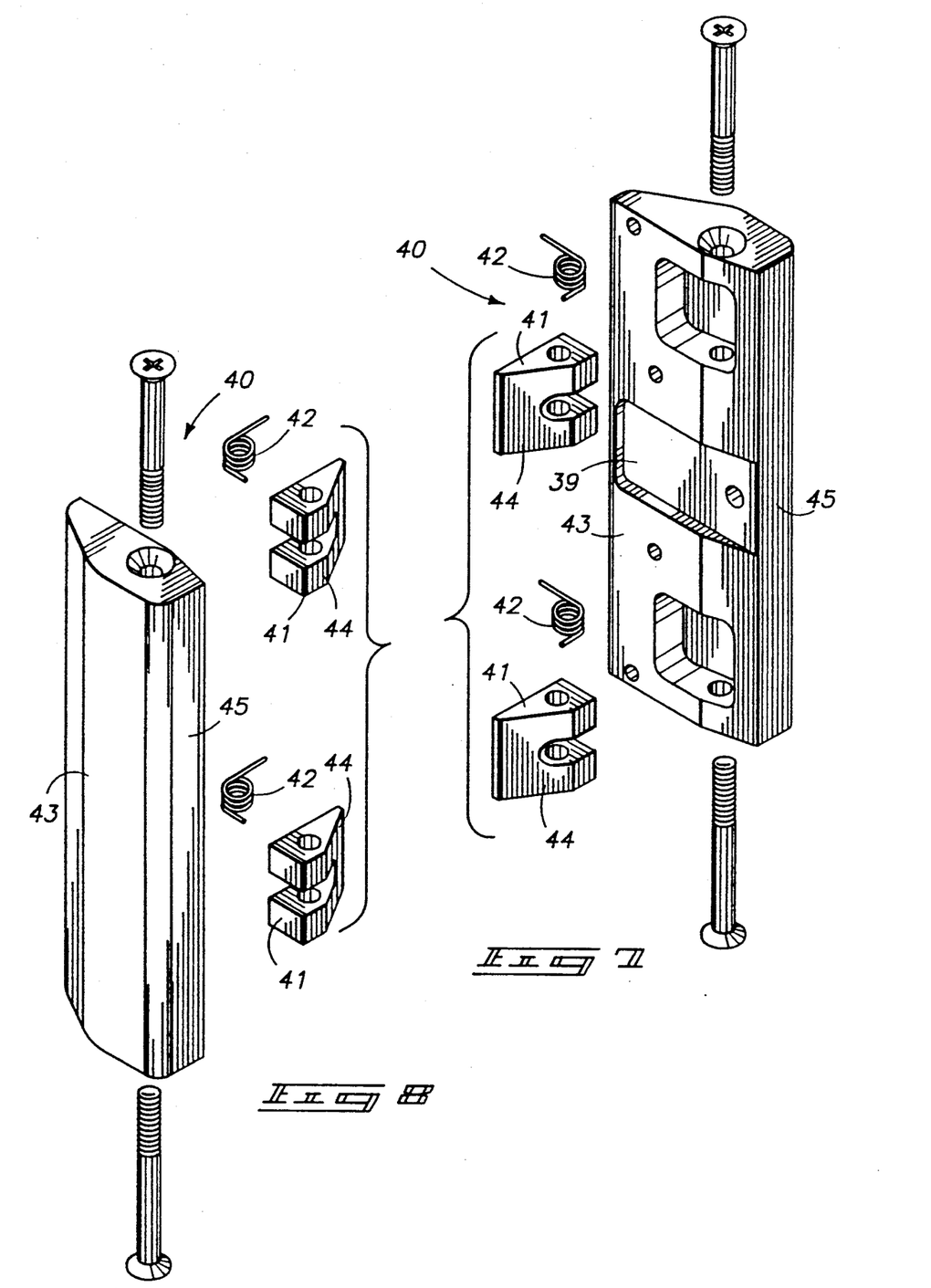
FIGS. 7 and 8 are exploded pictorial views illustrating a preferred yieldable drop marker stop arrangement for the dispensing chute.
Figure 9:
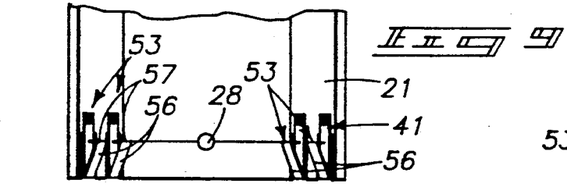
Figure 10:
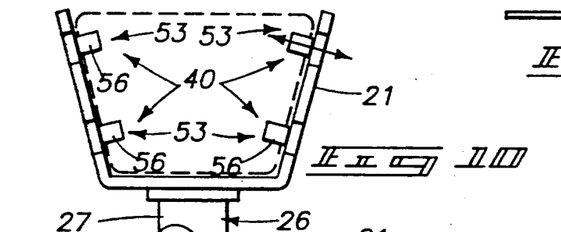

The fingers 41 and springs 42 are mounted to base members 43 (FIGS. 7, 8). The base members 43 in turn are attached by conventional means to the dispensing end 23 of the chute. Alignment surfaces 45 are provided on the base members 43 and face rearwardly to be engaged by the reloading magazine 70.

It is noted that the fingers 41, springs 42, and base members 43 may be releasably mounted to an existing form of chute. Therefore, the present dispenser 20 may be made by retrofitting the yieldable stop means 40 to an existing form of chute such as, for example, the chute disclosed in the above-referenced U.S. Pat. No. 3,470,846. The various alternate forms of the yieldable stop means described below may also be retrofitted to such a dispenser.

FIGS. 12–16 shown an alternate form of stop means 40 comprised of spring-biased fingers 46. In this form, fingers 46 are biased outwardly toward operative positions by means of compression springs 47 held within housings 48. Cam surfaces 49 are provided on the outwardly or rearwardly facing surfaces of the fingers to facilitate retraction of the fingers in response to reception of the second stack of drop markers.

Figure 14:
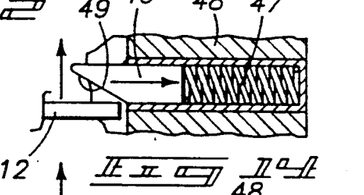
Figures 15, 16:
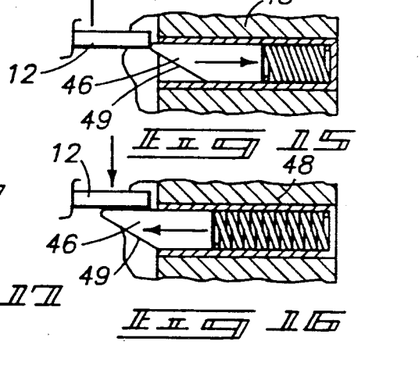

FIGS. 14–16 illustrate the motion of the fingers 46 responsive to reception of the leading card 12 from a stack of drop markers. FIG. 14 shows the card 12 initially engaging the cam surface 49 of the finger. As the card is forcibly moved inward, along the longitudinal axis of the chute, the engaged surface presses against the cam surface 49. As a result the spring finger 46 retracts into its housing 48. Then, when the card 12 passes by the spring finger 46 as shown in FIG. 16, the spring 47 will force the finger 46 back out. The surface on the finger 46 opposite the cam surface 49 now abuts the rearward surface of the card and will prevent the card from moving back outwardly along the longitudinal axis of the chute 21.

Figure 11:
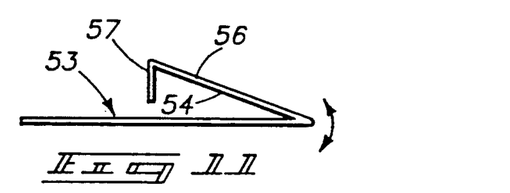
Figure 12:
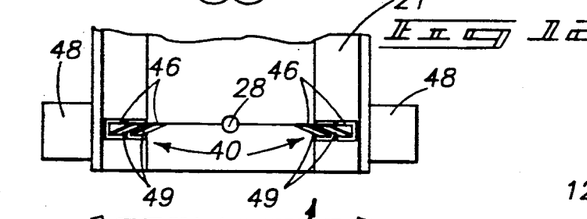
Figure 13:
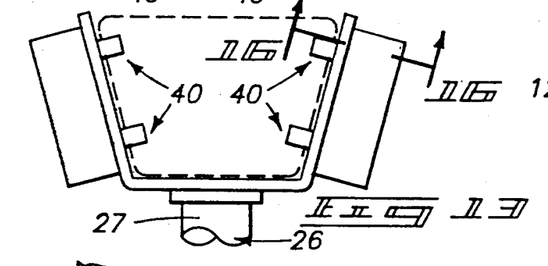

A still further form is illustrated in FIGS. 9–11 in which springbiased fingers 53 are mounted to inwardly facing surfaces of the chute walls. These fingers 53 are formed of leaf springs 54 bent to the configuration shown in FIG. 11. Here, inclined cam surfaces 56 are formed by angularly bent sections of the leaf springs 54. Inwardly bent portions 57 serve as stops. The one-way loading action with this arrangement is similar to that shown in FIGS. 14–16 with the exception that the leaf springs 54 will simply bend laterally out of the way as the in-fed stack of markers move past. The stop surfaces 57 will spring outwardly, bringing surfaces 57 into position to prevent discharge of the stack rearwardly through the chute dispensing end 23.

Figures 17, 18:
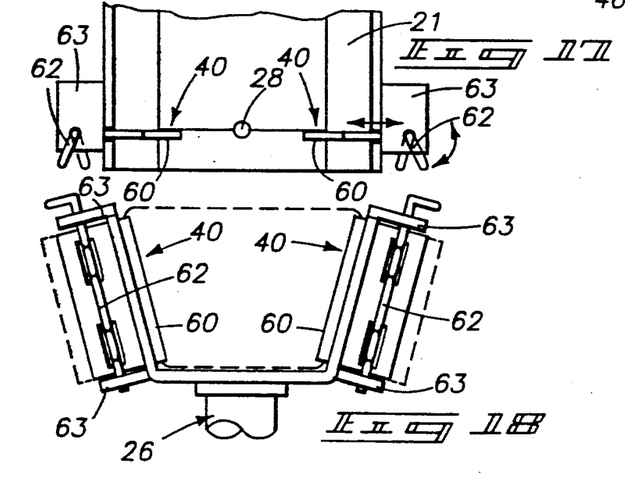
Figure 19:
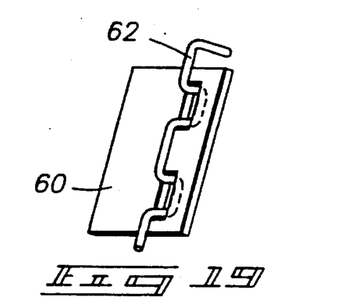

Another example of a stop means 40 is shown in FIGS. 17–19. Here, translationally movable stop members 60 are provided. The stop members 60 are actuated by pivoted bellcrank arms 62. Eccentric or "kinked" portions of the pivot arms 62 are received in complementary slots on the stop members 60. Pivotal movement of the pivot arms as indicated in FIG. 17, will cause corresponding lateral translational movement of the stop members 60 which are slidably received within slots formed in the dispenser chute 21. The pivot arms 62 are mounted by brackets 63 to the chute. This form of stop means may be manually operated, thereby eliminating the need for springs.

Figure 2:
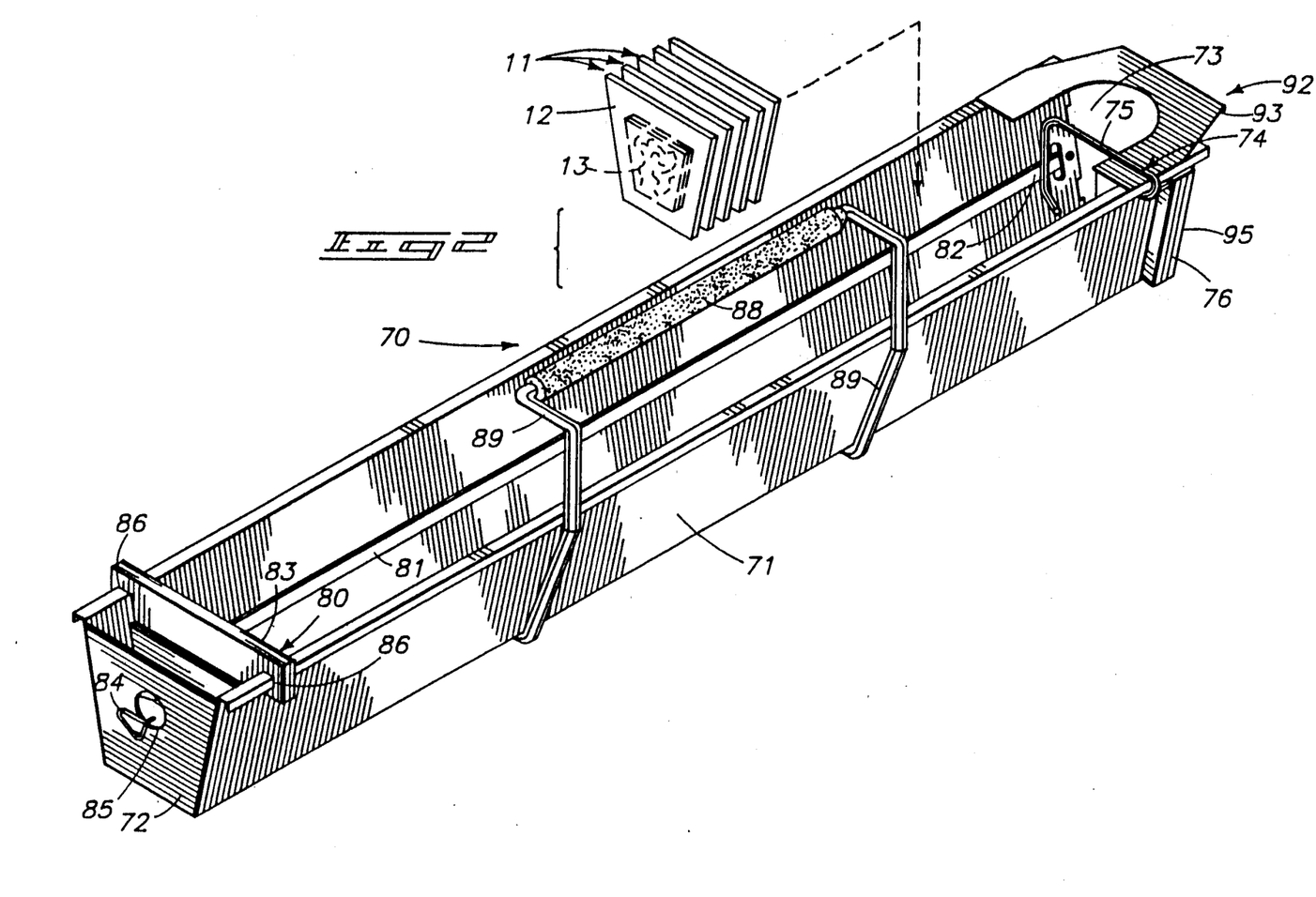
FIG. 2 is a pictorial view of a reloading magazine also incorporating features of the present invention.
Figure 3:
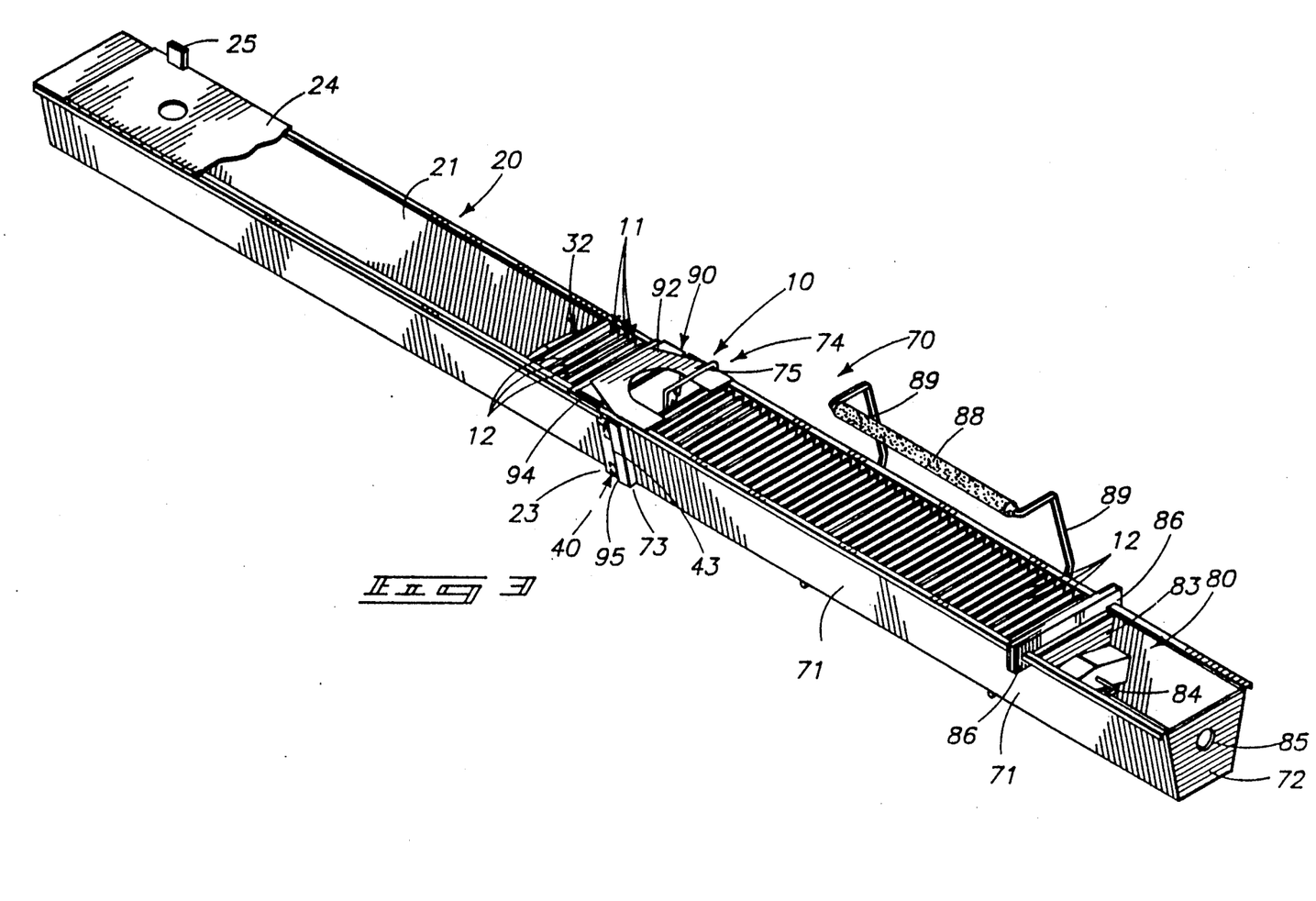
FIG. 3 is a pictorial view of the dispenser and reloading chute connected together for feeding drop markers from the reloading chute into the dispensing chute.

FIGS. 2, 3, and 4 illustrate the reloading magazine 70 briefly mentioned above. The reloading magazine 70 is intended to receive a second set or stack of drop markers for the purpose of recharging or reloading the drop marker dispenser 20. The reloading magazine 70 includes an elongated reloading chute 71. This chute 71 is substantially similar to the dispenser chute 21. It extends along a longitudinal axis from a closed end 72 to an open discharge end 73.

A selectively movable stop means 74 is provided adjacent the discharge end 73. Stop means 74 selectively prevent discharge of the second stack of drop markers through the discharge end 73 and along the longitudinal chute axis. The selectively movable stop 74 means is shown in an operative positive in FIG. 2 and in an outwardly pivoted, inoperative position in FIG. 4.

Figure 23:
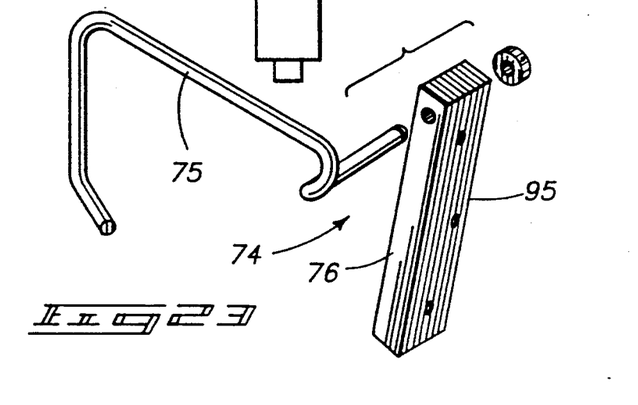
FIG. 23 is an exploded pictorial view of a movable stop arrangement mountable adjacent to the discharge end of the reloading chute.

FIG. 23 illustrates details of the movable stop means 74. It is basically comprised of a shaped bar 75 mounted to a base 76 for pivotal movement about an axis that is substantially parallel to the longitudinal axis of the reloading chute 71. The bar is bent to project into the chute when pivoted to the operative position.

Figure 5:
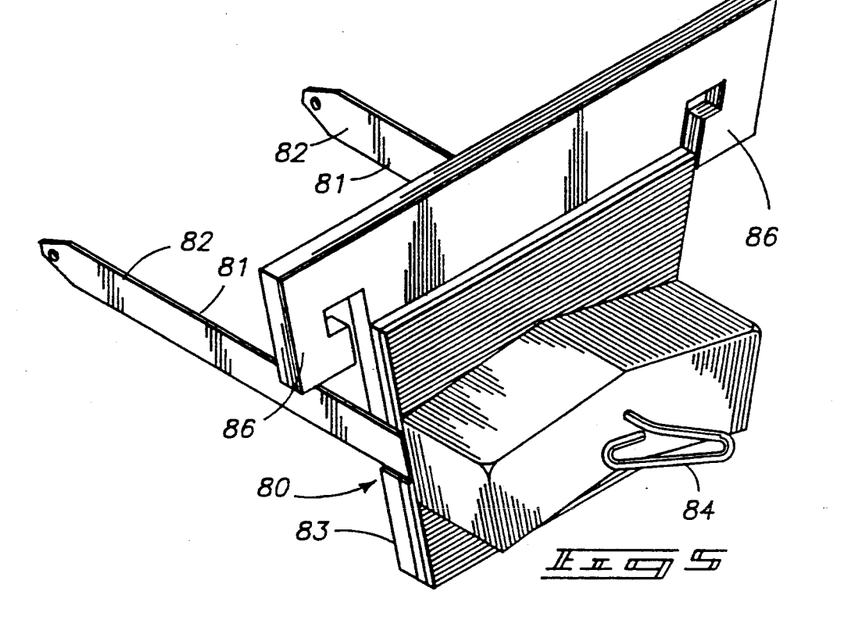
FIG. 5 is a pictorial view of a biasing arrangements for urging the stacks of markers along the longitudinal axis of the reloading chute.
Figure 6:
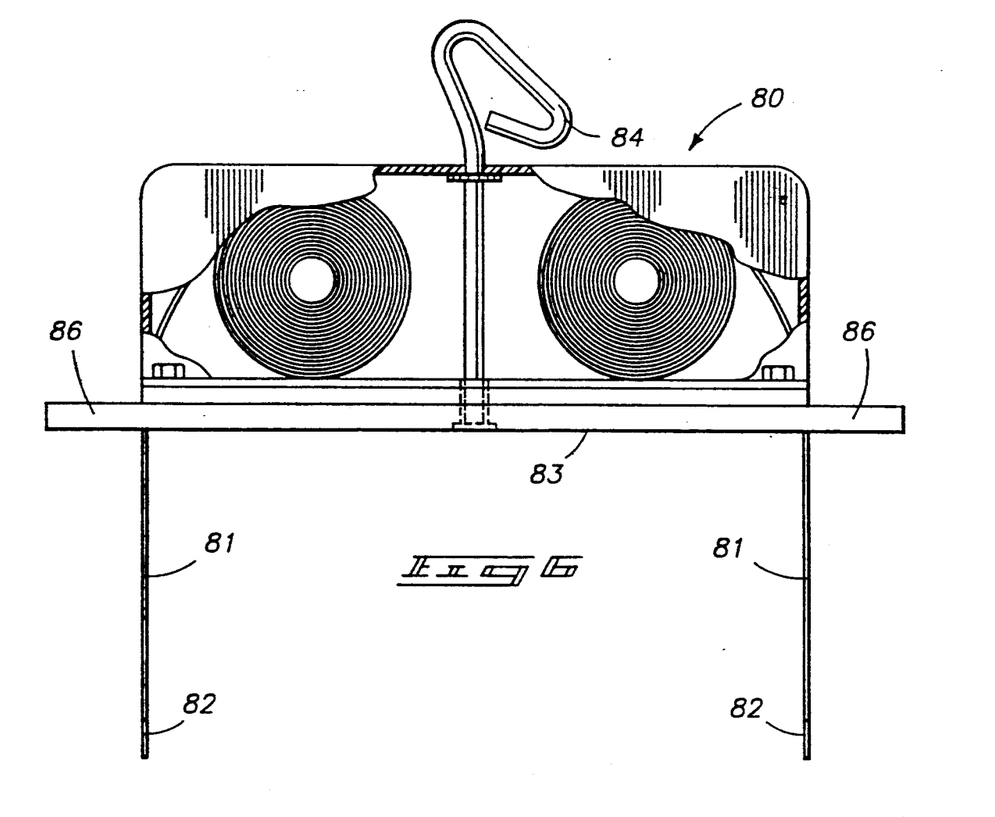
FIG. 6 is a fragmented plan view showing the spring mechanisms of the biasing arrangement shown in FIG. 5.

A second stack of drop markers received within the reloading magazine 70 may be continuously biased toward the operative movable stop means 74 by a second biasing means 80. Second biasing means 80 is shown in detail in FIGS. 5 and 6. Means 80 may be substantially similar to the first biasing means 32 described above.

Biasing means 80 includes a pair of flat strap coiled springs 81 having ends 82 attached to the chute 71 at the discharge end 73. A push plate 83 mounts the coils for the springs 81. The springs will yieldably unwind as the push plate is moved toward the closed chute end 72. They will continuously urge the push plate toward the discharge end 73. Thus, when the plate 83 engages the forward end of a replacement or second stack of drop markers within the chute 71, the force of the springs will urge the plate against the stack and continuously urge the stack towards the discharge end 73. The stop bar 75, pivoted to the operative position, will prevent discharge of the stack.

Guidance means 86 is provided on the second biasing means 80 to movably hold the push plate downwardly within the chute 71 for longitudinal movement therein. This is done to avoid the chance that the push plate will be lifted upwardly out of the chute 71 as it is being retracted. Guidance means 86 may simply be comprised of extensions of plate 83, fitted over the top longitudinal edges of the chute as shown in FIG. 2. Means 86 is shown in detail in FIG. 5.

A latch hook 84 is provided on the push plate 83. The latch hook 84 is releasably received through a latch opening 85 at the closed reloading chute end 72. The latch hook may be pushed through the opening 85 and attached to the closed end 72 in order to hold the push plate 83 in the position shown in FIG. 2. This facilitates loading of the reloading chute 71 without requiring that the user manually hold the push plate in the retracted position. Following reloading, the hook can be rotated to disengage from the chute end 73. The push plate 83 is then free to move against the stack, urging it towards the discharge end 73.

The reloading magazine 70 is also provided with a carrying handle 88. The handle 88 is mounted to a cantilevered frame 89. The frame substantially centers the handle 88 over the mass of the chute to balance the weight of the chute for ease in carrying. The handle is cantilevered to facilitate hand access to the full length of the upwardly open chute 71.

Figures 20, 21:
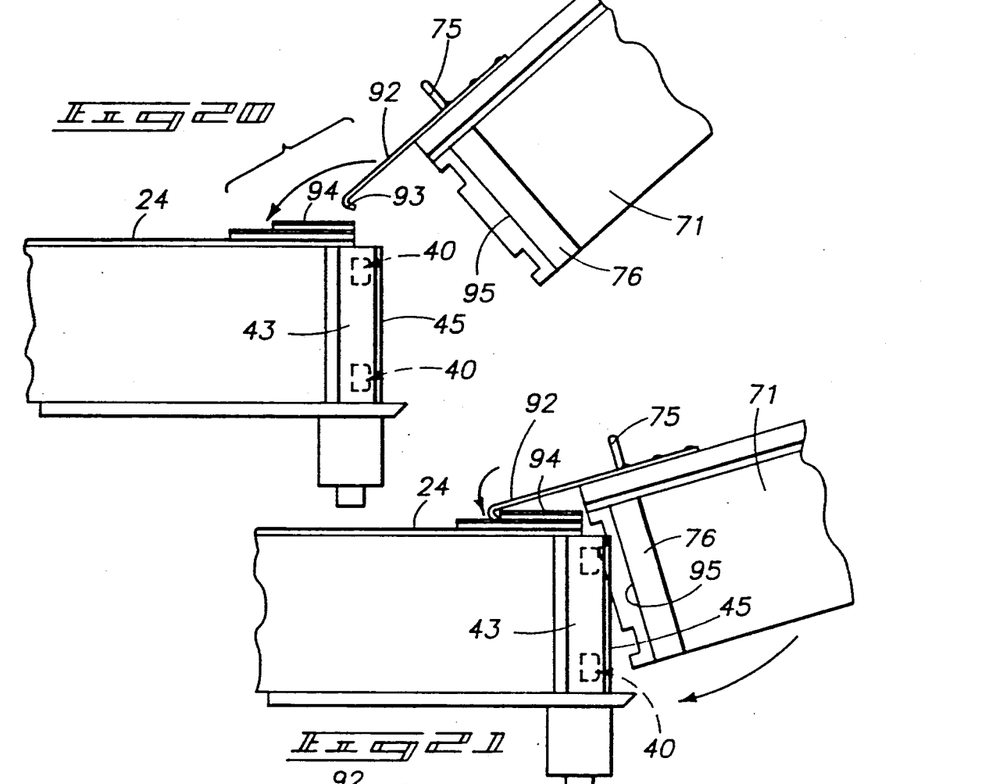
FIG. 20 is a fragmentary view illustrating a first step in the procedure for connecting the dispensing chute and reloading chute.
FIG. 21 is a view illustrating initial connection between the dispensing chute and reloading chute.

A connecting means 92 is provided as may be seen in FIGS. 3, 4, and in the operational views of FIGS. 20–22. The connector means 92 includes elements that are provided on both the dispenser chute 21 and on the reloading chute 71. A hook member 93 is provided on the reloading chute 71 while a mating bar member 94 is mounted to the dispenser chute 21. The hook member 93 is received over the bar member 94 as diagrammatically illustrated in the sequence of FIGS. 20 and 21. The hook prevents longitudinal separation of the dispenser chute 21 and the reloading chute 71 when the two are connected together for recharging the dispenser chute 21 with a secondary or replenishing supply of drop markers.

Figure 22:
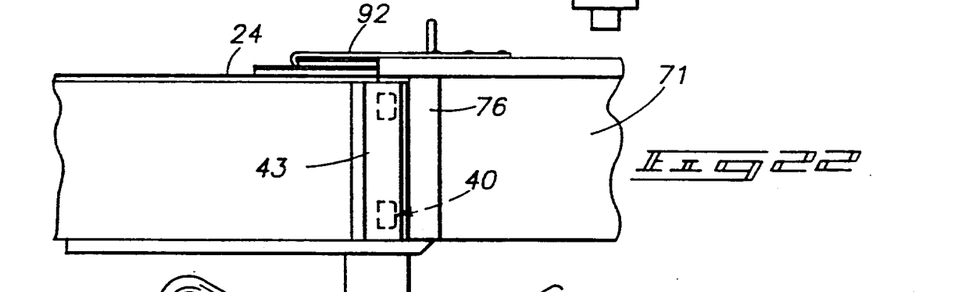
FIG. 22 is a view showing the complete connection between a reloading chute and dispensing chute.

Abutment or alignment surfaces 95 are also provided. Such surfaces 95 are provided on the reloading chute 71 for flush contact with similar abutment surfaces 45 on the base members 43 of the yieldable stop means 40. These surfaces 95, 45 are positioned to abut one another and hold the chutes 21 and 71 in longitudinal alignment when they are connected together as shown in FIGS. 3, 4, and 22.

In a retrofit arrangement, the bar member 94 would be provided for attachment to an existing dispenser chute such as that shown in the above-referenced patent (U.S. Pat. No. 3,470,846). Here, the bar would be attached by conventional fastening means (welding, bolts, etc.) and the yieldable stop means 40 would be likewise attached as suggested above, following removal of the standard rigid stop devices for the existing chute. This minor modification alters the standard chute configuration to facilitate loading by the reloading magazine 70.

The magazine may be attached through the assembled connecting means 92 and recharging of drop markers is facilitated through the mounted yieldable stop means 40. It is also advantageous that the first biasing means 32 be retrofitted to the existing chute as well. In doing so, the spring ends 34 are received within appropriate grooves or notches 39 formed in the base members 43. The spring ends may be attached by conventional fastening hardware such as screws, rivets, etc.

Operation of the retrofit system or that of the preferred complete system shown herein is easily accomplished.

Operation of the present invention will be described as if the drop marker dispenser 20 were mounted to the wing of an aircraft as it is believed the present system will be most useful in conjunction with aircraft. However, it is to be understood that the present system may be used with other vehicles.

Prior to reloading the dispenser 20, the reloading magazine 70 is filled with a stack of drop markers. This is accomplished easily and conveniently away from the drop marker dispenser 20 which may be in use on an aircraft to selectively drop the markers as described in the referenced U.S. Pat. No. 3,470,486. The ability to load the magazine 70 at a location away from the prop wash on the associated airplane and while the dispenser 20 is in use is a distinct advantage of the present invention.

Loading of the chute 71 is accomplished simply by placing the chute on an incline with the open discharge end 73 pointing angularly downward. This orientation allows the markers to be placed in the chute and maintained in position in the chute 71 without falling over. Loading of the markers is accomplished with the spring biasing means 80 pulled back and with the latch hook 84 secured through the latch opening 85 as shown in FIG. 2. This frees the open area of the chute to be filled with drop markers. Also, prior to loading, the selectively movable stop means 74 is pivoted to the closed position as also shown in FIG. 2.

With the chute slightly inclined, successive bundles of drop markers may be placed into the chute. The markers may be loaded in controlled stacks, or may be placed in wrapped bundles as shown in the above-reference patent (U.S. Pat. No. 3,428,019). If wrapped bundles are placed within the chute, the bundle wrapping is removed prior to feeding the accumulated stack of markers into the drop marker dispenser. This is done simply by tearing or cutting through the wrapping and simply pulling the wrap from the bundle.

Once the desired number of drop markers are placed within the chute 71, the latch hook 84 may be released to allow the second biasing means 80 to function. In doing so, the push plate 83 moves under spring tension against the stack of drop markers within the chute 71. The push plate 83 urges the stack toward the discharge end 73. However, discharge along the chute axis is prevented by the stop means 74, so the stack is securely held between the push plate 83 and stop bar 75. The reloading magazine 70 is now charged with drop markers and is ready for operation to reload the drop marker dispenser 20 when the supply therein is depleted and the aircraft lands for reloading.

Loading of the drop marker dispenser 20 may be accomplished quickly, as the aircraft pulls into position and the engine is set at idle speed. The reloading process then follows with the steps below:

1. The reloading person carries the reloading magazine 70 (by means of the carrying handle 88) to the dispenser 20.

2. The connecting means 92 is then secured by the reloading person lifting and hooking the hook member 93 on the reloading magazine to hook over the bar member 94 on the dispenser 20 as sequentially shown in FIGS. 20, 21 and 22. This secures the reloading magazine 70 in longitudinal alignment with the drop marker dispenser 20 and facilitates loading of the replenishing stack of markers through the dispensing and reloading opening 23 of the dispenser 20.

3. When the two chutes 21, 71 are properly connected and aligned, the reloading person may simply grasp and pivot the movable stop bar 75 to its inoperative position as shown in FIG. 4. This allows the second biasing means 80 to urge the replenishing stack of drop markers longitudinally along the reloading chute, past its discharge end 73 and through the dispensing end 23 of the drop marker dispenser 20.

4. The reloading person may now selectively assist the biasing means 80 to overcome the reverse spring action of the first biasing means 32 within the drop marker dispenser 20. This may be accomplished by light hand pressure applied behind the push plate 83 in the direction of the discharge end 73. The stack of drop markers will slide along the reloading chute, out the discharge end 73 and into the drop marker dispenser 20.

5. When the dispenser is full, the markers which have not been pushed into the dispenser are pulled back slightly with one hand to allow the reloading magazine stop means 74 to be pivoted back into its operative position. (The stop means 74 and spring force provided by the second biasing means 80 again provide positive control over any remaining drop markers which happen to be left in the reloading magazine 70.)

6. The reloading person then checks that the rearmost drop markers in the dispenser 20 have been pushed far enough forward to allow the yieldable stop means 40 to spring to the closed position and contain the stack within the drop marker dispenser.

7. The reloading magazine 70 is then unhooked from the dispenser 20 and the reloading person carries the now empty or near empty magazine 70 back to a remote location for later replenishment.

The dispenser 20 is now full and the aircraft is free to move into action.

Total time for reloading a full supply of drop markers from the magazine 70 and into the dispenser 20 is a matter of seconds as opposed to the several minutes required to manually load the prior form of dispenser as shown in above-referenced U.S. Pat. No. 3,470,846.

Since spring pressure provides control of markers within the dispenser 20 and also provides all necessary force to move these markers rearward into position for discharge, there is no need for a ram pressure air opening at the front of the dispenser as shown in the above-referenced patent. This improvement assists in maintaining the markers within the dispenser in a weatherproof condition. Furthermore, no tuning of ram air pressure is required as the spring pressure is constant and reliable. In fact, the entire dispenser, with the exception of the discharge end, may be sealed so as to be weatherproof. The lid 24 need not be opened unless repair, replacement, or maintenance is required for the contained first biasing means 32.

Feeding the drop marker dispenser 20 through the dispensing/reloading opening 23 by simply pushing a stack of markers into the dispenser from a reloading magazine is a significant improvement over the prior manual loading, due in part to the speed at which the reloading may be accomplished, and to the positive control of the otherwise possibly loose drop markers. The markers are maintained in a controlled, orderly condition while being transported to the dispenser, and while being loaded into the dispenser.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A drop marker system for loading and dispensing streamer type drop markers from an organized stack of such markers, comprising:

a drop marker dispenser including an elongated dispenser chute, for receiving a stack of the drop markers extending along a longitudinal dispenser axis from a dispensing end;

discharge means on the drop marker dispenser adjacent the dispensing end thereof, for selectively ejecting drop markers from the stack in a direction transverse to the longitudinal dispenser axis;

a reloading opening on the dispenser chute for receiving a stack of drop markers loaded therethrough;

a reloading magazine;

the reloading magazine including an elongated reloading chute for receiving a second stack of drop markers extending along a longitudinal reloading axis to an open discharge end;

connecting means on the reloading chute and the dispensing chute for releasably joining and aligning the reloading chute at the discharge end thereof and the dispensing chute at the reloading opening thereof to enable the second stack of drop markers held within the reloading chute to be moved through the open discharge end of the reloading magazine and reloading opening and into the dispensing chute.

2. The drop marker system of claim 1 wherein the reloading opening and dispensing end of the dispensing chute are coincidental.

3. The drop marker system of claim 1 wherein the dispensing chute includes biasing means within the chute for yieldably urging the stack of drop markers along the longitudinal dispenser axis toward the dispensing end.

4. The drop marker system of claim 1 wherein the dispensing chute includes a first biasing means within the chute for yieldably urging the stack of drop markers along the longitudinal dispenser axis toward the dispensing end; and wherein the reloading chute includes a second biasing means for yieldably biasing the stack of drop markers along the longitudinal reloading axis toward the discharge end thereof.

5. The drop marker system of claim 1 wherein the reloading chute includes biasing means within the chute for yieldably urging the stack of drop markers along the longitudinal reloading axis toward the discharge end thereof; and wherein the reloading chute further includes a selectively movable stop means adjacent the discharge end thereof selectively movable between an operative position to abut the second stack of drop markers, and an inoperative position clear of the second stack of drop markers, thereby allowing the second stack of drop markers to be moved through the discharge end.

6. The drop marker system of claim 1 wherein the dispensing chute and reloading chute include substantially identical biasing means for yieldably biasing the respective stacks of drop markers toward their respective dispensing and discharge ends.

7. The drop marker system of claim 1 wherein the dispensing chute includes biasing means for yieldably urging the stack of drop markers along the longitudinal dispenser axis toward the dispensing end; and yieldable stop means at the dispensing end for abutment with successive drop markers at the dispensing end to hold the markers from being discharged along the longitudinal dispenser axis, and for yielding to allow loading of a second stack of drop markers through the dispensing end along the longitudinal dispenser axis.

8. The drop marker system of claim 1 wherein the dispensing chute includes stop means at the dispensing end for abutment with successive drop markers at the dispensing end to hold the markers from being discharged along the longitudinal dispenser axis, and for movement laterally to allow loading of a second stack of drop markers through the dispensing end along the longitudinal dispenser axis.

9. The drop marker system of claim 1 wherein the dispensing chute includes yieldable stop means comprised of spring biased fingers projecting into the dispensing chute at the dispensing end for abutment with successive drop markers at the dispensing end to hold the markers from being discharged along the longitudinal dispenser axis, and for yielding to allow loading of a second stack of drop markers through the dispensing end along the longitudinal dispenser axis.

10. The drop marker system of claim 1 wherein the connecting means includes a hook member on one of the chutes and a transverse bar member on the remaining chute;

the hook and bar members being shaped to interfit when the chutes are moved relative to one another into an aligned condition; and abutment surfaces on the chutes for engaging and holding the chutes in alignment when the hook and bar are interconnected.

11. The drop marker system of claim 1 wherein the dispensing chute includes movable stop means comprised of stop members projecting into the dispensing chute in substantial transverse alignment with the discharging means at the dispensing end for abutment with successive drop markers at the dispensing end to hold the markers from being discharged along the longitudinal dispenser axis, and for manual movement to an inoperative position to allow loading of a second stack of drop markers through the dispensing end along the longitudinal dispenser axis.

12. A drop marker system for dispensing streamer type drop markers arranged in an organized stack along a longitudinal stack axis, comprising:

a drop marker dispenser including an elongated dispenser chute extending along a longitudinal dispenser axis, for receiving a stack of the drop markers with the dispenser axis and stack axis substantially parallel;

wherein the chute includes an open dispensing end;

biasing means within the chute for yieldably urging the stack of drop markers along the longitudinal dispenser axis toward the dispensing end discharge means at the dispensing end, for selectively ejecting drop markers from the stack in a direction transverse to the longitudinal dispenser axis;

yieldable stop means at the dispensing end for abutment with successive drop markers at the dispensing end to hold the markers from being discharged along the longitudinal dispenser axis, and for yielding to allow loading of drop markers through the dispensing end along the longitudinal dispenser axis;

a reloading magazine;

the reloading magazine including an elongated reloading chute extending along a longitudinal reloading axis to an open discharge end, and having an opening therein for receiving a second stack of markers therein along the reloading axis;

reloading biasing means within the reloading chute for yieldably urging the second stack of markers received within the reloading chute along the reloading axis toward the open discharge end;

a movable stop at the discharge end of the reloading chute movable thereon between a first position positioned to abut the second stack of markers in the reloading chute and to prevent the markers from discharging through the open discharge end, and a second position clear of the stack to enable the second stack to be moved along the reloading axis through the discharge end; and connecting means on the reloading chute and the dispensing chute for releasably joining the reloading chute and dispensing chute with the longitudinal axes substantially coaxial such that the movable stop may be moved to the second position and a second stack of drop markers held within the reloading chute may be moved translationally along the substantially coaxial axes from the reloading chute and into the dispensing chute.

13. A drop marker feed system for loading stacks of drop markers arranged in an organized stack with each marker substantially transverse to a longitudinal stack axis, into a drop marker dispenser chute through a dispensing end thereof, comprising:

a reloading magazine;

the reloading magazine including an elongated reloading chute for receiving a second stack of drop markers extending along a longitudinal reloading axis to an open discharge end;

connecting means comprised of a first member on the reloading chute and a second member adapted to be attached to the drop marker dispenser chute at the dispensing end thereof, for releasably joining and aligning the reloading chute at the discharge end thereof and the dispensing chute at the dispensing end thereof to enable the second stack of drop markers held within the reloading chute to be moved through the open discharge end of the reloading magazine and into the dispensing chute.

14. The drop marker feed system of claim 13 wherein the second member includes yieldable stop means mountable to the dispensing chute at the dispensing end for abutment with successive drop markers at the dispensing end to hold the markers from being discharged along a longitudinal dispenser axis, and for yielding to allow loading of said second stack of drop markers through the dispensing end along the longitudinal dispenser axis.

15. The drop marker feed system of claim 13 wherein the second member includes yieldable stop means comprised of spring biased fingers mountable to the dispensing chute to project into the dispensing chute at the dispensing end for abutment with successive drop markers at the dispensing end to hold the markers from being discharged along a longitudinal dispenser axis, and for yielding to allow loading of said second stack of drop markers through the dispensing end along the longitudinal dispenser axis.

16. The drop marker feed system of claim 13 wherein the second member includes movable stop means comprised of stop members mountable to the dispenser chute to selectively project into the dispensing chute in substantial transverse alignment with the discharging means at the dispensing end for abutment with successive drop markers at the dispensing end to hold the markers from being discharged along a longitudinal dispenser axis, and for manual movement to an inoperative position to allow loading of said second stack of drop markers through the dispensing end along the longitudinal dispenser axis.

17. The drop marker feed system of claim 13 further comprising a movable stop at the discharge end of the reloading chute movable thereon between a first position positioned to abut the second stack of markers in the reloading chute and to prevent the second stack of markers from discharging through the open discharge end, and a second position clear of the stack to enable the second stack to be moved along the reloading axis through the discharge end.

18. The drop marker feed system of claim 13 further comprising a biasing means within the reloading chute for yieldably urging the second stack of drop markers along the longitudinal reloading axis toward the discharge end thereof; and a selectively movable stop means adjacent the discharge end selectively movable between an operative position to abut the second stack of drop markers, and an inoperative position clear of the second stack of drop markers, thereby allowing the second stack of drop markers to be moved through the discharge opening.

19. The drop marker feed system of claim 13 further comprising:

a biasing means within the dispenser chute for yieldably urging the stack of drop markers along a longitudinal dispenser axis toward the dispensing end thereof, and guidance means for movably holding the biasing means within the dispenser chute for longitudinal movement therein.

20. The drop marker feed system of claim 13 further comprising a biasing means comprised of a pair of strap springs extending from free ends mounted to the reloading chute adjacent the discharge end thereof to a transverse push plate within the reloading chute for engaging and yieldably urging the second stack of drop markers along the longitudinal reloading axis toward the discharge end thereof.

* * * * *

UNITED STATES PATENT AND TRADEMARK OFFICE
CERTIFICATE OF CORRECTION

PATENT NO. :    5,078,076
DATED       :    January 7, 1992
INVENTOR(S) :   Edwin E. Chesnut It is certified that error appears in the above-identified patent and that said Letters Patent is hereby corrected as shown below:

On the title page item [19] and [75]:

The patent document misspelled the inventor's name. The correct spelling is CHESNUT.

Signed and Sealed this

Twentieth Day of April, 1993

Attest:

MICHAEL K. KIRK

*Attesting Officer*    Acting Commissioner of Patents and Trademarks